United States Patent
Pellin et al.

(10) Patent No.: US 9,849,475 B2
(45) Date of Patent: Dec. 26, 2017

(54) DUAL HEATER SYSTEM FOR SPRAY DISPENSER

(71) Applicant: Graco Minnesota Inc., Minneapolis, MN (US)

(72) Inventors: Christopher J. Pellin, Burnsville, MN (US); Jeffrey N. Velgersdyk, Minnetonka, MN (US); Joshua D. Roden, Lake Elmo, MN (US); Bryan K. Colby, Columbia Heights, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 0 days.

(21) Appl. No.: 14/650,758

(22) PCT Filed: Dec. 16, 2013

(86) PCT No.: PCT/US2013/075414
§ 371 (c)(1),
(2) Date: Jun. 9, 2015

(87) PCT Pub. No.: WO2014/099796
PCT Pub. Date: Jun. 26, 2014

(65) Prior Publication Data
US 2016/0184846 A1    Jun. 30, 2016

Related U.S. Application Data

(60) Provisional application No. 61/737,883, filed on Dec. 17, 2012.

(51) Int. Cl.
*B05D 1/02* (2006.01)
*B05B 7/16* (2006.01)
(Continued)

(52) U.S. Cl.
CPC .......... *B05B 7/1693* (2013.01); *B05B 7/0093* (2013.01); *B05B 7/0408* (2013.01);
(Continued)

(58) Field of Classification Search
CPC ... B05B 7/0093; B05B 7/0408; B05B 7/1693; B05B 7/2497; B05B 7/0416; B05B 7/166; B05B 9/002; B05D 1/02; B05D 1/34
(Continued)

(56) References Cited

U.S. PATENT DOCUMENTS 4,809,909 A      3/1989   Kukesh
5,171,613 A  *  12/1992   Bok ...................... B01F 5/0619
                                                              118/667
(Continued)

FOREIGN PATENT DOCUMENTS

RU          2218293 C2    12/2003

OTHER PUBLICATIONS

Extended European Search Report for EP Application No. 13866372.9, dated Jun. 292, 2016, 7 pages.
(Continued)

*Primary Examiner* — Alexander Valvis
(74) *Attorney, Agent, or Firm* — Kinney & Lange, P.A.

(57) ABSTRACT

A mobile spray dispenser comprises a fluid circulation system and a heating unit. The fluid circulation system has a motorized pump capable of circulating fluid from a fluid reservoir in a high-pressure spray mode and a low-pressure recirculation mode, and of providing the fluid to a sprayer. The motorized pump draws lower power in the low-pressure recirculation mode than in the high-pressure spray mode. The heating unit is disposed within the fluid circulation system to heat the fluid to a target temperature, and comprises a primary heater and a boost heater. The primary heater is configured to be active during both the high-
(Continued)

pressure spray mode and the low-pressure recirculation mode. The boost heater is in fluid series with the primary heater, and is configured to be active only during the low-pressure recirculation mode.

17 Claims, 6 Drawing Sheets

(51) Int. Cl.
    *B05B 7/04*     (2006.01)
    *B05B 9/00*     (2006.01)
    *B05B 7/00*     (2006.01)
    *B05B 7/24*     (2006.01)
    *H05B 1/02*     (2006.01)
    *B05D 1/34*     (2006.01)

(52) U.S. Cl.
CPC ............ *B05B 7/0416* (2013.01); *B05B 7/166* (2013.01); *B05B 7/2497* (2013.01); *B05B 9/002* (2013.01); *B05D 1/02* (2013.01); *H05B 1/0202* (2013.01); *H05B 1/0244* (2013.01); *B05D 1/34* (2013.01)

(58) Field of Classification Search
USPC ................ 239/124–127, 130, 131, 135–139; 118/302, 679–684
See application file for complete search history.

(56) References Cited

U.S. PATENT DOCUMENTS

| | | | |
|---|---|---|---|
| 5,662,269 A * | 9/1997 | Francis | .................. B08B 3/026 134/107 |
| 6,161,775 A | 12/2000 | Brown et al. | |
| 6,666,385 B1 | 12/2003 | Gonitzke et al. | |
| 8,318,259 B2 * | 11/2012 | De Winter | ............ B05B 1/3442 264/309 |
| 9,221,669 B2 * | 12/2015 | Tix | .......................... F04B 17/03 |
| 2002/0158138 A1 | 10/2002 | Yekutiely et al. | |
| 2007/0045289 A1 | 3/2007 | Kott et al. | |
| 2008/0283629 A1 | 11/2008 | Shank et al. | |

OTHER PUBLICATIONS

International Search Report and Written Opinion from PCT Application Serial No. PCT/US2013/075414, dated Apr. 16, 2014, 10 pages.

Russian Office Action from Application No. 2015127916/05, dated Aug. 28, 2017, 11 pages.

* cited by examiner

DUAL HEATER SYSTEM FOR SPRAY DISPENSER

BACKGROUND

The present invention relates generally to spray dispensers that are used to apply polyurea coatings, polyurethane foam, and the like. More particularly, this invention relates to a heater system and heater control scheme for a mobile spray dispenser.

Mobile spray dispensers are used to apply a variety of materials. Spray dispensers for polyurea, polyurethane, and similar materials have separate "A-side" and "B-side" fluid systems with separate fluid reservoirs, pumps, fluid lines, and heaters. The separate "A-side" and "B-side" fluid systems carry different fluids, which are combined at a spray head to rapidly form foam or coatings. "A-side" fluids can include isocyanates, while "B-side" fluids can contain resins, polyol, flame retardants, and amine catalysts. The resulting mixture of "A-side" and "B-side" fluids typically cures in about ten seconds.

"A-side" and "B-side" fluids are mixed at a sprayer disposed to aerosolize the mixed fluids and dispense the aerosol mixture on a target surface. In order to allow fluids to be sprayed, fluids in both sides are pressurized to a high pressure by separate pumps, and heated. Some spray dispensers heat fluids with dedicated heaters to reduce fluid viscosity, thereby improving fluid flow and increasing spray efficiency. Both heaters and pumps draw considerable power. In mobile systems, which may need to draw power from 120V or 230V grid power sources, it is essential that total power draw not exceed rated circuit amperage limits.

SUMMARY

A mobile spray dispenser comprises a fluid circulation system and a heating unit. The fluid circulation system has a motorized pump capable of circulating fluid from a fluid reservoir in a high-pressure spray mode and a low-pressure recirculation mode, and of providing the fluid to a spray applicator. The motorized pump draws lower power in the low-pressure recirculation mode than in the high-pressure spray mode. The heating unit is disposed within the fluid circulation system to heat the fluid to a target temperature, and comprises a primary heater and a boost heater. The primary heater is configured to be active during both the high-pressure spray mode and the low-pressure recirculation mode. The boost heater is in fluid series with the primary heater, and is configured to be active only during the low-pressure recirculation mode.

DETAILED DESCRIPTION

Figure 1:
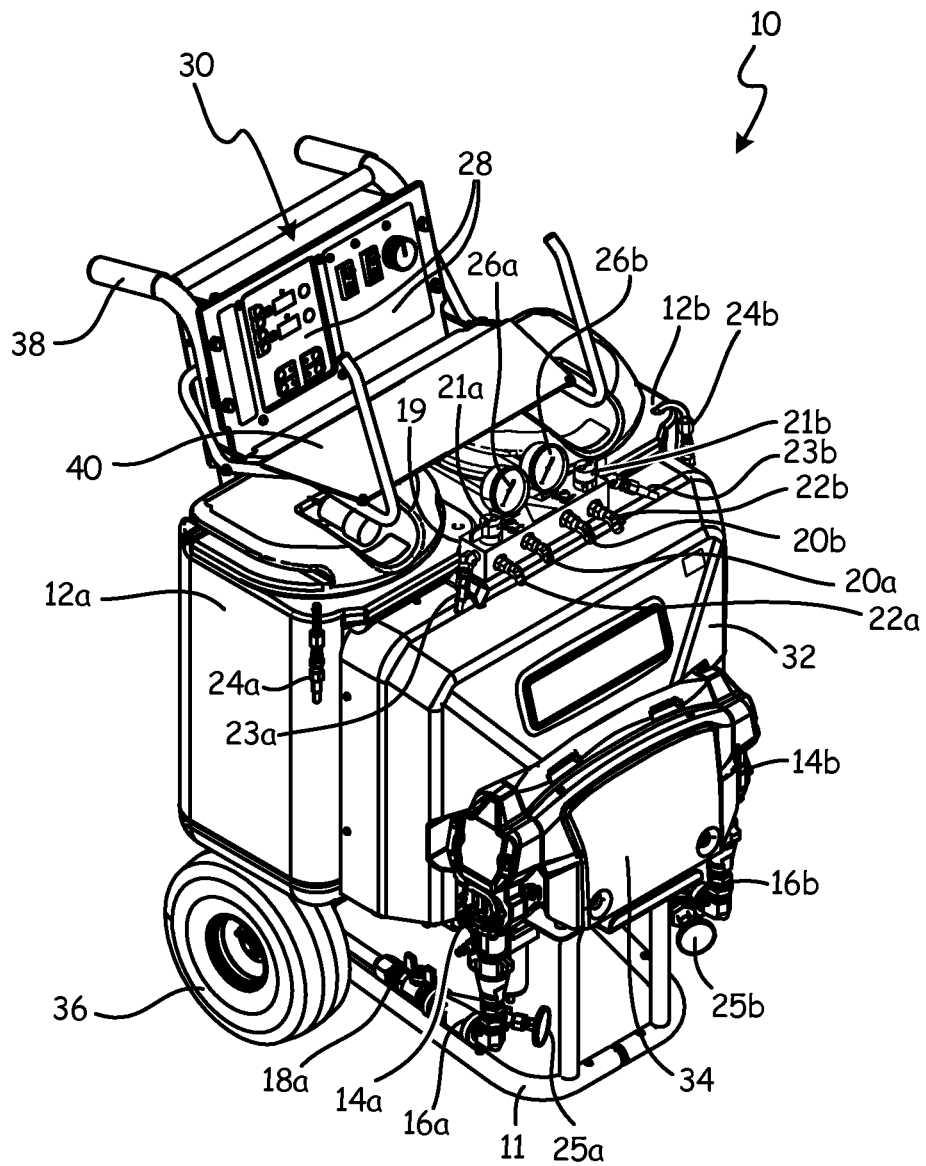
FIG. 1 is a perspective view of a mobile spray dispenser.
Figure 2:
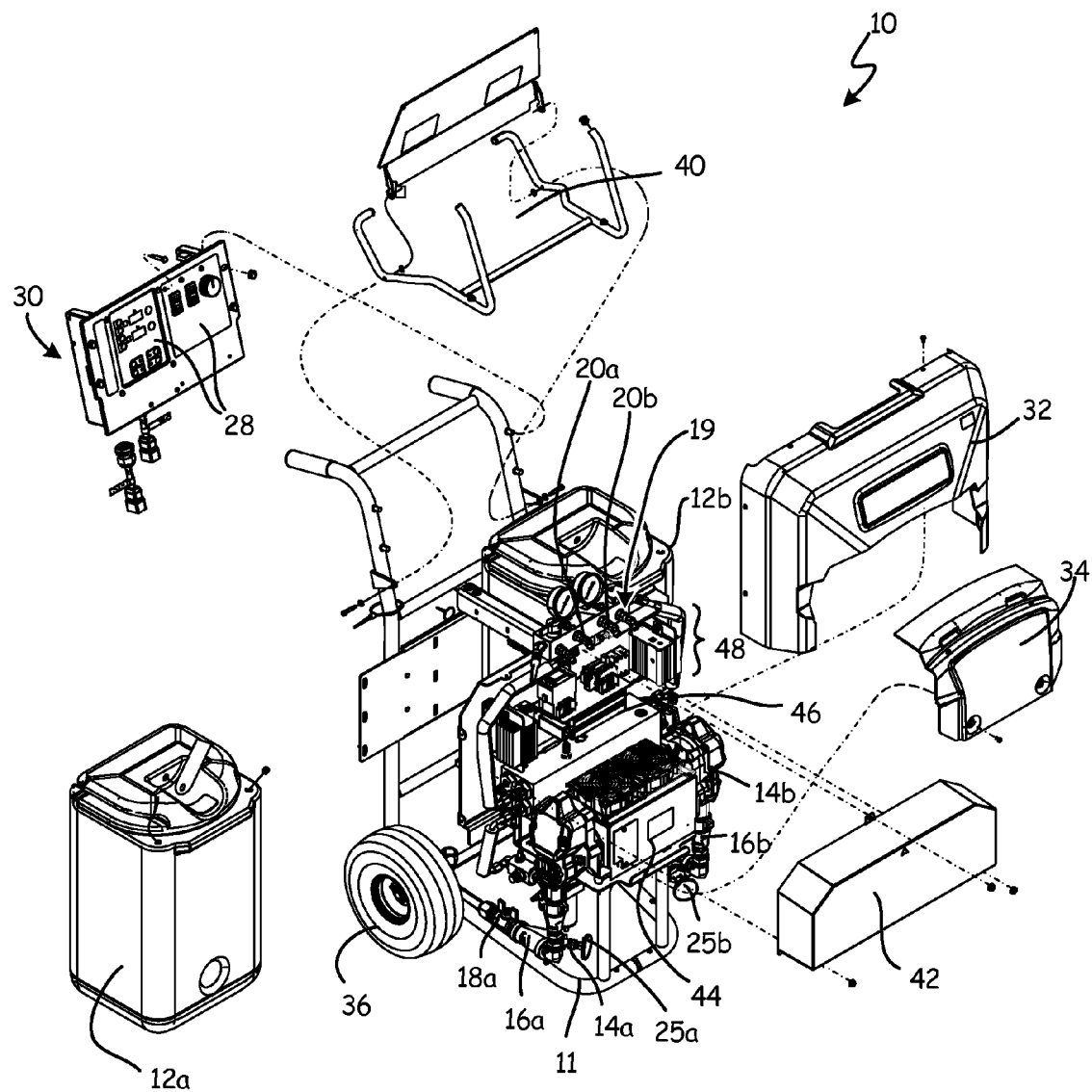
FIG. 2 is an exploded view of the mobile spray dispenser of FIG. 1, illustrating a heating unit and a heater control section.

FIGS. 1 and 2 are perspective and exploded perspective views, respectively, of spray dispenser 10. Spray dispenser 10 is a mobile applicator, e.g. for polyurethane foam or polyurea coatings. Spray dispenser 10 has separate A-side and B-side fluid systems with parallel components and architecture labeled as elements 12a, 14a, 16a, etc. for A-side components, and 12b, 14b, 16b, etc. for B-side components. Spray dispenser 10 comprises structural frame 11, reservoirs 12a and 12b, pumps 14a and 14b, fluid lines 16a and 16b, cutoff valve 18a, hose manifold 19 (with outlet hose connections 20a and 20b, recirculation valves 21a and 21b, return hose connections 22a and 22b, and recirculation hose connections 23a and 23b), reservoir ports 24a and 24b, inlet temperature gauges 25a and 25b, outlet pressure gauges 26a and 26b, primary controller 28, interface 30, heater system cover 32, pump system cover 34, wheels 36, handles 38, and storage tray 40. Secondary cover 42, motor 44, heater module 46, and heater control system 48 are visible in FIG. 2, but not FIG. 1, while some elements illustrated in both FIG. 1 and FIG. 2 are not relabeled in FIG. 2, to improve legibility of FIG. 2. FIGS. 1 and 2 are hereinafter discussed concurrently.

Structural frame 11 is a rigid support structure to which all other elements of spray dispenser 10 are directly or indirectly attached. Reservoirs 12a and 12b are storage tanks for fluids that cure when combined. A-side reservoir 12a can, for instance, carry isocyanates, while B-side reservoir 12b can, for instance, carry resins, polyol, flame retardants, or amine catalysts. Pumps 14a and 14b are motorized pumps disposed to draw fluid from reservoirs 12a and 12b through fluid lines 16a and 16b so long as cutoff valve 18a remains open. Cutoff valve 18a can, for example, be a ball valve, butterfly valve, or similar valves disposed to interrupt fluid line 16a in a closed valve state. A parallel cutoff valve (i.e. cutoff valve 18b), not visible in FIG. 1 or 2, is similarly disposed on fluid line 16b. Pumps 14a and 14b force fluid from fluid lines 16a and 16b through heaters (see heater module 46, described in detail below with respect to FIGS. 2-6) to outlet hose connections 20a and 20b, respectively, of hose manifold 19.

Hose manifold 19 is a fluid routing structure comprising outlet hose connections 20a and 20b, recirculation valves 21a and 21b, return hose connections 22a and 22b, and recirculation hose connections 23a and 23b. Hose connections 20a, 20b, 22a, 22b, 23a, and 23b are hookup locations for flexible hoses. Outlet hose connections 20a and 20b attach to outlet hoses that deliver fluid from pumps 14a and 14b to sprayer 27 (see FIG. 3), which may be a handheld applicator or spray gun. Return hose connections 22a and 22b attach to return hoses that return unsprayed fluid from sprayer 27 to hose manifold 19. Recirculation valves 21a and 21b are cutoff valves that selectively allow or disallow fluid flow from return hose connections 22a and 22b to recirculation hose connections 23a and 23b, respectively. Recirculation hose connections 23a and 23b attach to recirculation hoses that ordinarily terminate at reservoir ports 24a and 24b to return recirculated A- and B-side fluids to their respective reservoirs 12a and 12b. For cleaning or maintenance, however, recirculation hoses can be disconnected from reservoir ports 24a and 24b to purge fluid from spray dispenser 10.

Fluid lines 16a and 16b are equipped with inlet temperature gauges 25a and 25b, and outlet hose connections 20a and 20b are equipped with outlet pressure gauges 26a and 26b. These gauges allow an operator to visually ascertain whether A-side and B-side fluid temperatures and pressures are within acceptable ranges. Spray dispenser 10 may also include internal pressure and temperature sensors (not shown) read by primary controller 28. Primary controller 28 is a logic-capable device with interface 30. Primary controller 28 can, for instance, include a microprocessor and machine readable memory elements, and serves as both an overall control device for spray dispenser 10 and a motor controller for motor 44 (see FIGS. 2 and 5) of pumps 14a and 14b. Interface 30 is an input-output interface by which an operator can, for example, select target pressures and temperatures, turn spray dispenser 10 on and off, select a mode (e.g. recirculation or spray, discussed in greater detail below) for spray dispenser 10, and monitor temperatures and pressures. Primary controller 28 is a part of a heating and power control system described in greater detail with respect to FIGS. 5 and 6.

Heater system cover 32 and pump system cover 34 are protective shields that protect heating and pump system components from damage, and protect operators from exposure to hot parts. Pump system cover 34 covers pumps 14a and 14b and motor 44, while heater system cover 32 covers heater module 46 and heater control system 48 (see FIG. 2). Wheels 36 and handles 38 are affixed to structural frame 11 allow spray dispenser 10 to be moved, and storage tray 40 provides an area to stow outlet and return hoses while they are not in use.

Referring particularly to FIG. 2, fluid lines 16a and 16b draw fluid directly from the bottom of reservoirs 12a and 12b, respectively. Pumps 14a and 14b are driven by motor 44. Motor 44 can, for example, be a double-ended motor connected to both A-side pump 14a and B-side pump 14b to drive both. In alternative embodiments, motor 44 may comprise multiple sub-motors. Pumps 14a and 14b drive fluid through heater module 46 on the way to outlet hose connections 20a and 20b. Secondary cover 42 is a protective shield disposed beneath heater system cover 32, and surrounds and protects heater control system 48.

Figure 5:
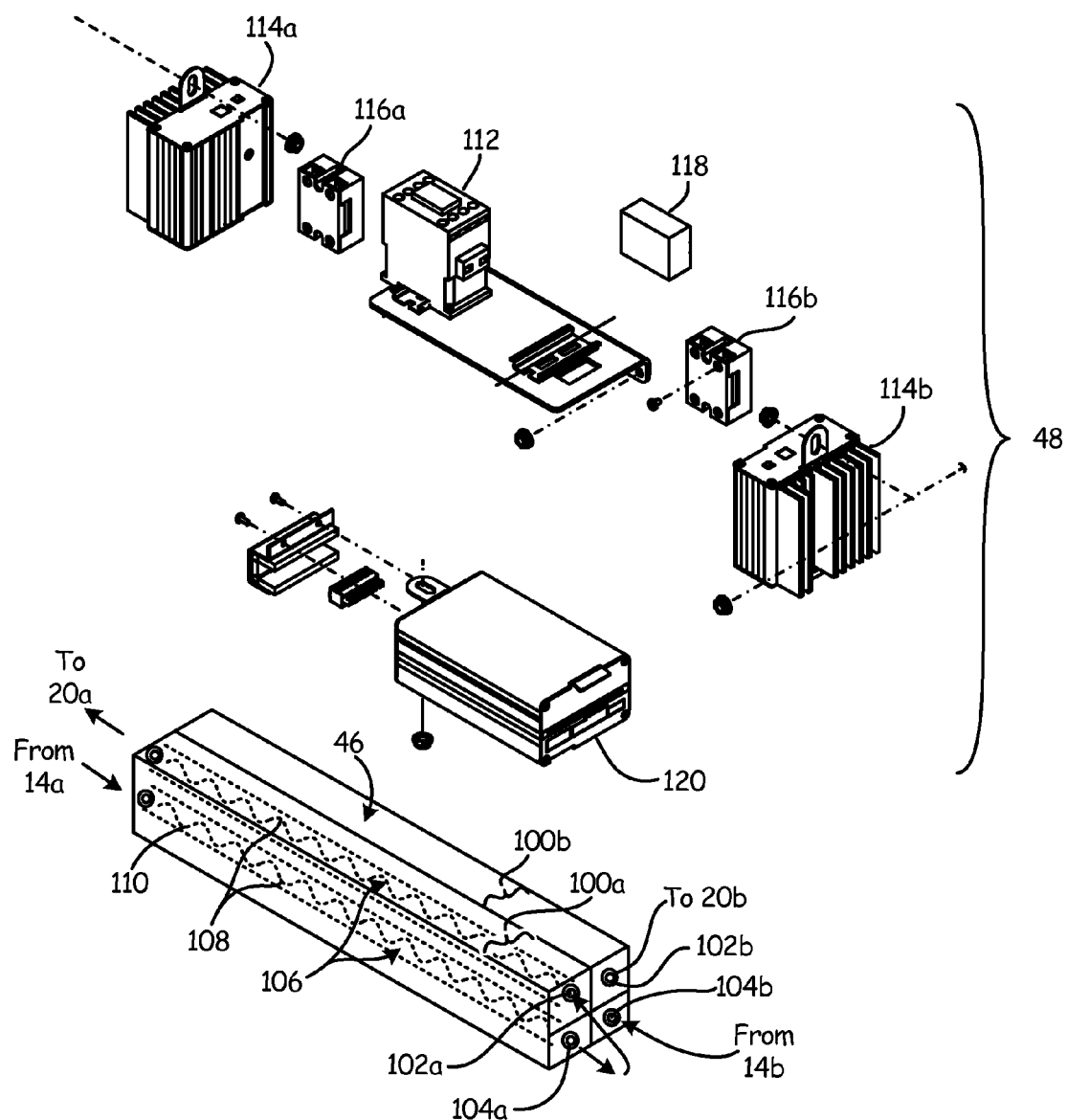
FIG. 5 is an exploded view of the heater control section of FIG. 2.

Heater module 46 is a resistive heating system with a plurality of internal fluid lines and resistive heating elements described in greater detail with respect to FIG. 5. Heater module 46 comprises separate primary heaters and boost heaters for each fluid side (A and B). Heater control system 48 is a logic capable power distribution system that selectively powers components of heater module 46 to achieve target temperatures designated via primary controller 28.

Spray dispenser 10 can operate in at least two modes: a recirculation mode in which pumps 14a and 14b operate at low pressure to circulate A-side and B-side fluids through heater module 46, and a spray mode in which pumps 14a and 14b operate at high pressure for spraying and aerosolizing fluids. The recirculation mode is primarily used during device startup to heat fluids to target temperatures prior to spraying, whereas the spray mode is primarily used while spraying is underway.

As described in greater detail below with respect to FIGS. 3-6, heater control system 48 powers primary heaters during both spray and recirculation modes, but only powers boost heaters during recirculation modes. This heating control scheme provides greater heating in a recirculation mode, when the need for additional heating is most critical, while reserving power for motor 44 to drive pumps 14a and 14b to higher pressure during the spray mode.

Figure 3:
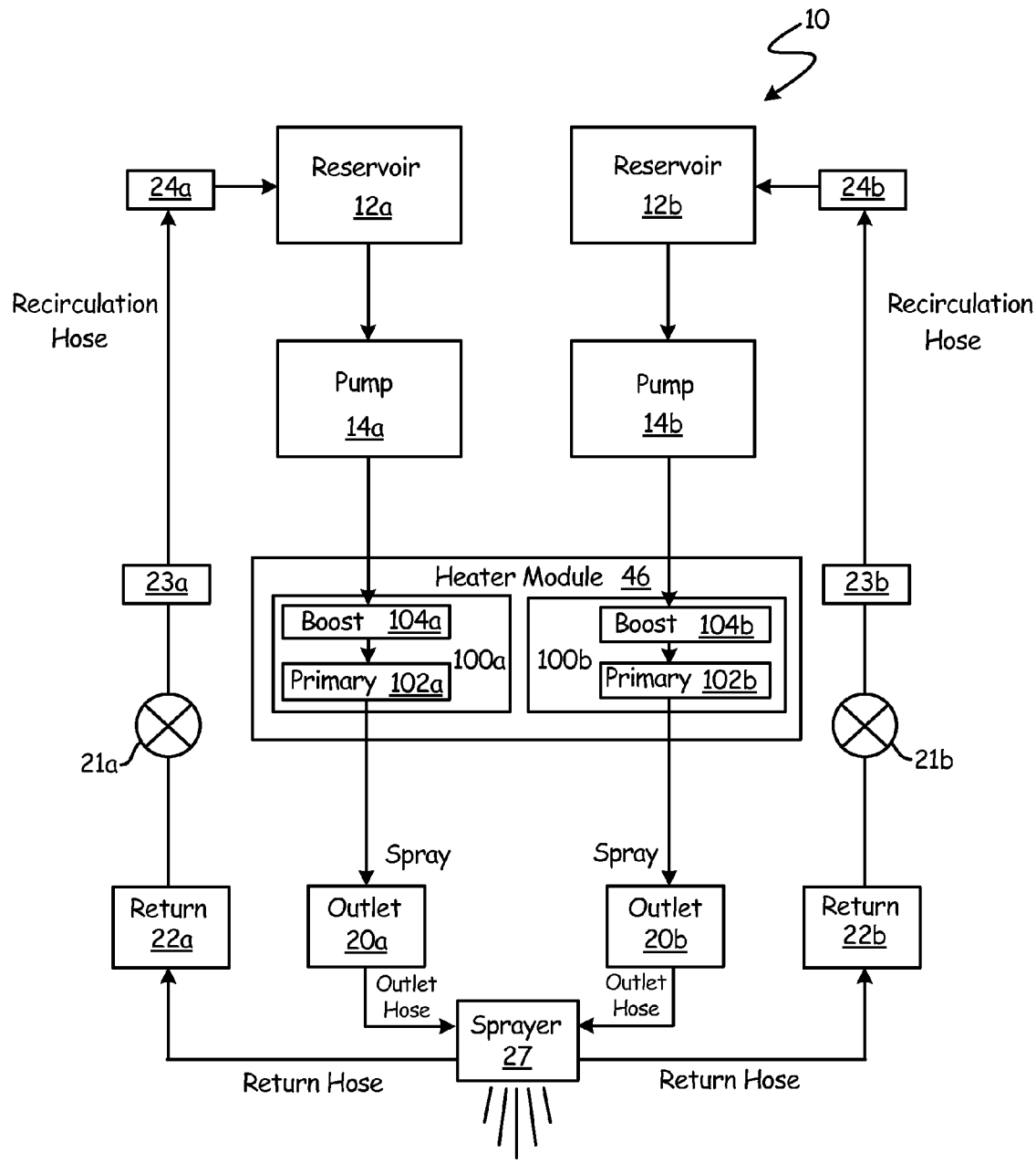
FIG. 3 is a schematic view of the mobile spray dispenser of FIG. 2.

FIG. 3 is a schematic view illustrating fluid flow through spray dispenser 10. As described above with respect to FIG. 1, pumps 14a and 14b pump fluids from reservoirs 12a and 12b, respectively, through heater module 46 to outlets 20a and 20b, respectively. Heater module 46 comprises A-side heater section 100a and B-side heater section 100b. A-side heater section 100a comprises primary heater 102a and boost heater 104a, and receives fluid from A-side pump 14a, while B-side heater section 100b comprises primary heater 102b and boost heater 104b, and receives fluid from B-side pump 14b. Although primary heater 102a and 102b and boost heaters 104a and 104b are shown as individual elements, each heater can in some embodiments be formed from multiple heating elements. A-side heater section 100a feeds outlet 20a, while B-side heater section 100b feeds outlet 20b. Each outlet connects to sprayer 27 via a corresponding outlet hose. Sprayer 27 can, for example, be a handheld sprayer applicator or spray gun that combines and sprays A-side and B-side fluids when a trigger is depressed. Return hoses connect sprayer 27 to return hose connections 22a and 22b, allowing unsprayed fluids to return to hose manifold 19.

In an open state, recirculation valves 21a and 21b enable fluid recirculation by providing a fluid path from sprayer 27 to reservoirs 12a and 12b via return hose connection 22a and 22b, recirculation hose connection 23a and 23b, recirculation hoses, and reservoir ports 24a and 24b. In this valve state, sprayer 27 is ordinarily closed (i.e. not spraying), and fluid can follow a closed circuit from reservoirs 12a or 12b through pumps 14a or 14b, outlet hose connections 20a or 20b, return hose connections 22a or 22b, recirculation hose connections 23a or 23b, and reservoir ports 24a or 24b back to reservoirs 12a or 12b. This valve state is primarily utilized in the recirculation mode, and circulates fluid through heaters in heater module 46 in order to increase the temperature of A- and B-side fluids so as to lower viscosities in preparation for spraying. In the recirculation mode, pumps 14a and 14b operate at low pressures sufficient to circulate fluid, but not typically sufficient for spray application from sprayer 27.

In a closed state, recirculation valves 21a and 21b prevent fluid flow from return hose connections 22a and 22b to recirculation hose connections 23a and 23b. This valve state is primarily utilized in the spray mode, such that fluid from reservoirs 12a and 12b and pumps 14a and 14b has no other flow path than through sprayer 27, and pressure at sprayer 27 is accordingly increased. This increased pressure allows fluids to be mixed, aerosolized, and sprayed. A-side and B-side fluids cure rapidly when in contact with one another (e.g. within ~10 seconds), and are accordingly only allowed to contact at sprayer 27. In some embodiments, recirculation valves 21a may be only mostly closed in the spray mode, so as to alleviate overpressures at sprayer 27.

Motor 44 draws relatively low power in the recirculation mode, leaving greater power available for heater 46. Accordingly, spray dispenser 10 powers boost heaters 104a and 104b in recirculation mode, thereby reducing warm-up times necessary to heat fluids to target operating temperatures before spraying can commence. In spray mode, pumps 14a and 14b operate at high pressures sufficient for spray application from sprayer 27. Motor 44 correspondingly draws relatively high power in the spray mode, and boost heaters 104a and 104b are accordingly deactivated.

Figure 4:
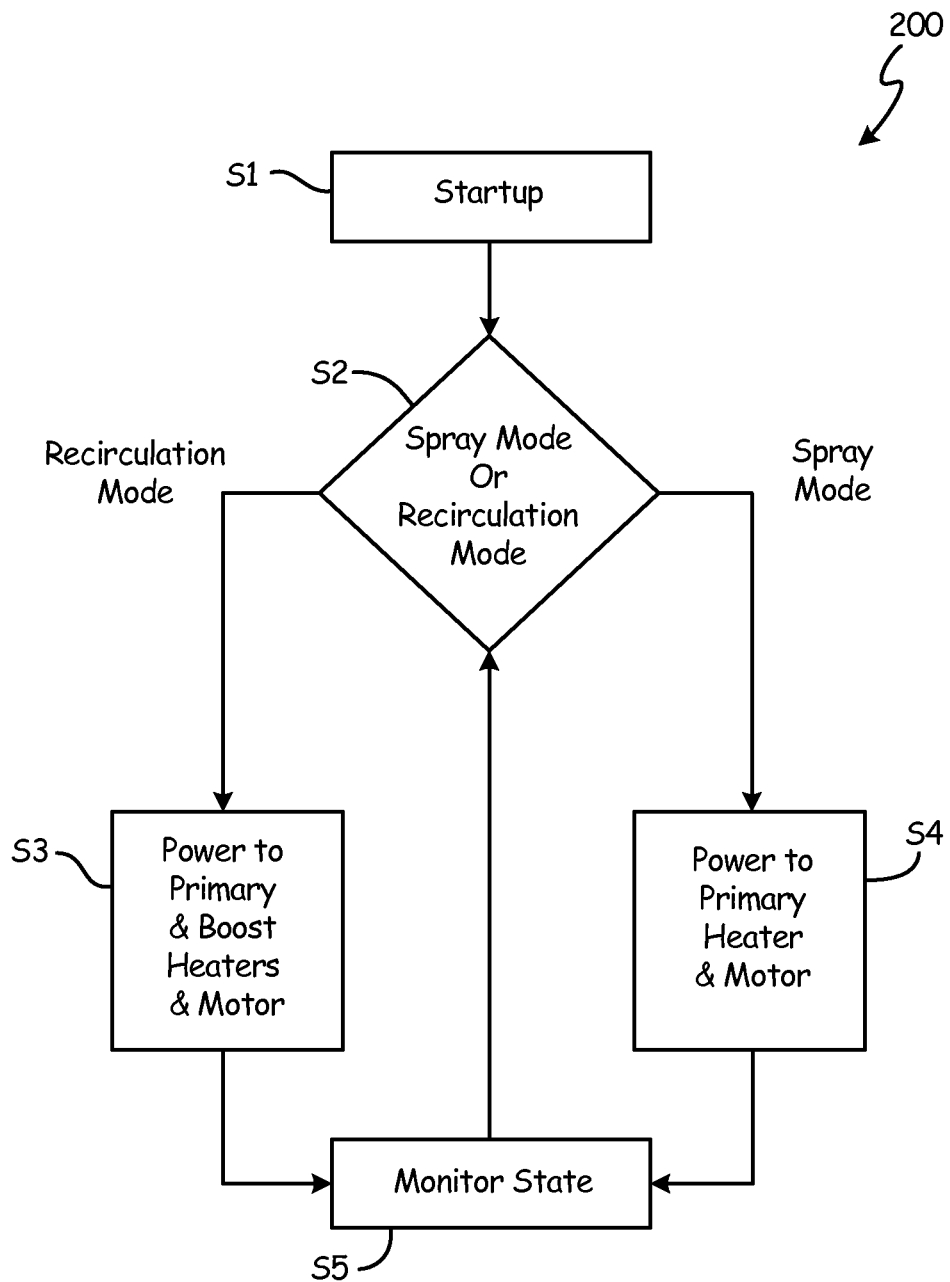
FIG. 4 is a logic flowchart illustrating a method of operation for the mobile spray dispenser of FIGS. 1-3.

FIG. 4 is a logic flowchart illustrating method 200, a method of operation of spray applicator 10. At startup, mobile applicator 10 draws power from one or more grid connections to power controllers, sensors, and logic devices in primary controller 28, heater control system 48, and interface 30. (Step S1). In one embodiment, all power is drawn via interface 30 through two power circuits with separate grid connections: a heater power circuit, and a motor power circuit (see FIG. 6, below). Primary controller 28 next enters a spray mode or a recirculation mode, as described above with respect to FIG. 4. (Step S2). In some embodiments, the mode may be selected directly by a user via interface 30. In other embodiments, primary controller 28 may automatically enter the spray or recirculation mode based on sensed fluid pressure and/or temperature, commanded fluid pressure and/or temperature, elapsed time since startup, and/or power draw. In the recirculation mode, primary controller 28 directs power to primary heaters 102a and 102b, to boost heaters 104a and 104b, and to motor 44. (Step S3). In spray mode, primary controller 28 directs power to primary heaters 102a and 102b and to motor 44. (Step S4). Power routing is explained in greater detail below with respect to FIG. 6. While in either mode, primary controller 28 and heater control system 48 may monitor the state of mobile applicator 10 and update its operating mode (i.e. spray or recirculation) based on new sensed or commanded values. (Step S5).

Figure 6:
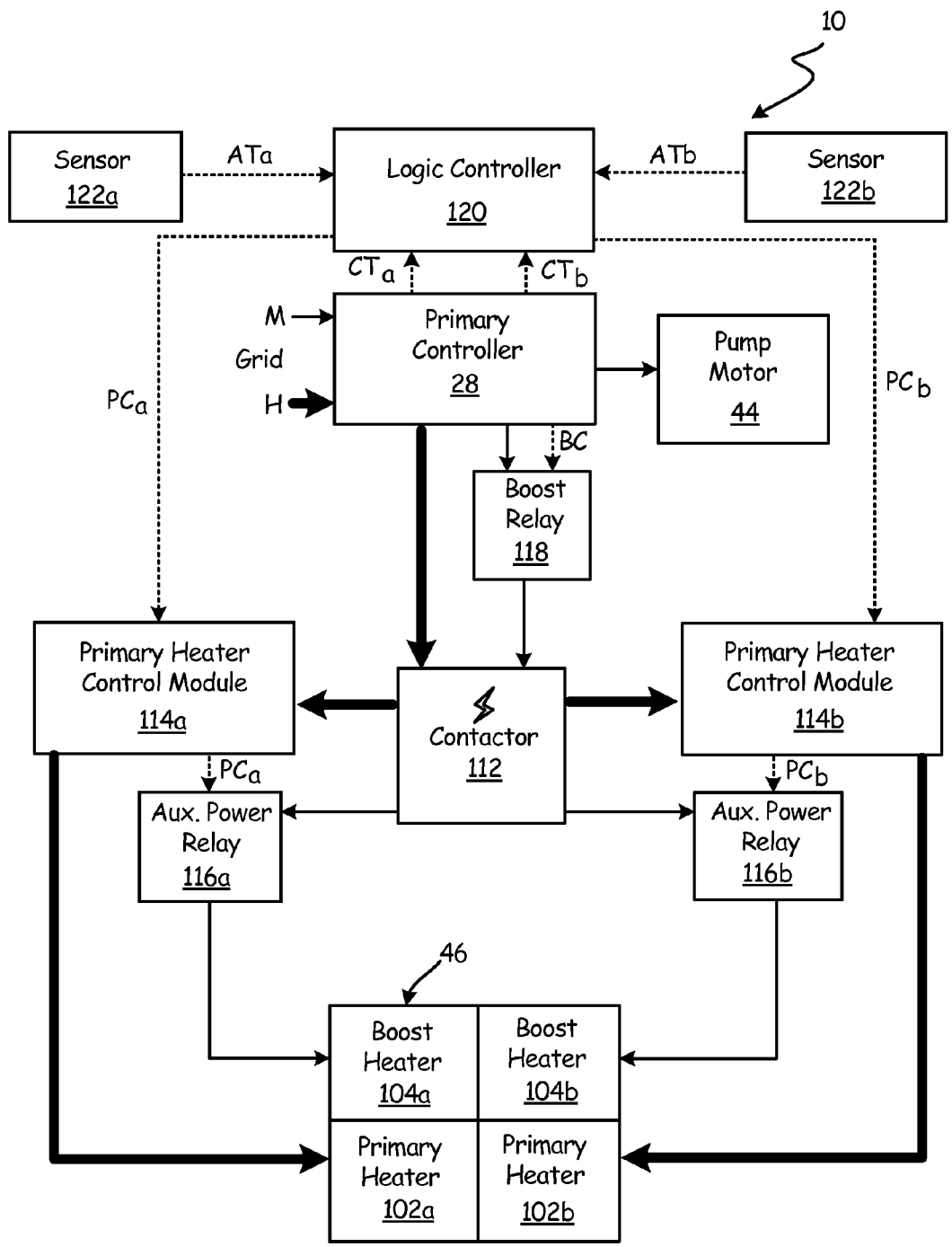
FIG. 6 is a schematic view of the heater control section of FIG. 2.

FIG. 5 is a perspective view of heater module 46 and heater control system 48. FIG. 5 illustrates A-side heater section 100a, B-side heater section 100b, primary heaters 102a and 102b, boost heaters 104a and 104b, fire rod heaters 106 (with heating elements 108 and helical fluid lines 110), contactor 112, primary heater control modules 114a and 114b, auxiliary power relays 116a and 116b, boost relay 118, and heater logic controller 120. FIG. 6 is a schematic view of primary controller 28, pump motor 44, heater module 46, and heater control system 48. FIG. 6 illustrates primary heaters 102a and 102b, boost heaters 104a and 104b, contactor 112, primary heater control modules 114a and 114b, auxiliary power relays 116a and 116b, boost relay 118, heater logic controller 120, and temperature sensors 122a and 122b. FIGS. 5 and 6 are hereinafter discussed concurrently.

As described above with respect to FIG. 3, A-side fluid from pump 14a flows first through boost heater 104a, and then through primary heater 102a of A-side heater section 100a. B-side fluid from pump 14b flows analogously through primary heater 102b and boost heater 104b of B-side heater section 100b. In one embodiment, primary heaters 102a and 102b are connected to boost heaters 104a and 104b, respectively, via integral fluid passages within heater module 46. In an alternative embodiment, primary heaters 102a and 102b are connected to boost heaters 104a and 104b via external fluid lines, piping, or tubing. In various embodiments, each heater (including primary heaters 102a and 102b, and boost heaters 104a and 104b) comprises at least one compact resistive heating element disposed to resistively heat passing fluid when pulsed with a nonzero voltage.

In the embodiment depicted in FIG. 5, each heater comprises a fire rod heater 106 with a heating element 108 and at least one wrapped fluid line 110. Heating elements 108 are thermally conductive rods formed, e.g., of aluminum or steel, and inset with resistive heaters. Helical fluid lines 110 are helical flow passages surrounding heating elements 108 and extending from one side to the other of primary heater 102a or 102b, or boost heater 104a or 104b. Helical fluid lines 110 can, for example, be fixed channels or flexible tubes coiled about heating elements 108. In alternative embodiments, other resistive heating elements can be substituted for fire rod heaters 106. Secondary heaters 104a and 104b may, for example, have approximately half the wattage of primary heaters 102a and 102b. In 120V grid embodiments of spray dispenser 10, primary heaters 102a and 102b may for example draw 1000 W, and boost heaters 104a and 104b only 500 W. In 230V grid embodiments of spray dispenser 10, primary heaters 102a and 102b may for example draw 1380 W, and boost heaters 104a and 104b only 620 W.

Heater control system 48 delivers pulsed power to primary heaters 102a and 102b and boost heaters 104a and 104b at controlled intervals, in order to achieve and maintain target fluid temperatures while ensuring that overall power draw by spray dispenser 10 does not exceed available grid power. Grid power may, for example, be available at 120V or 230V via two 20 A or 15 A connections, respectively. In the depicted embodiment, grid power is drawn from two distinct grid connections with separate power circuits: heater power circuit H, and motor power circuit M. (see FIG. 6). In alternative embodiments, a larger or smaller number of grid connections and dedicated power circuits may be used. Power is routed through primary controller 28. Heater power circuit H powers primary heaters 102a and 102b. Motor power circuit M powers pump motor 44 during spray mode, and boost heaters 104a and 104b during recirculation mode. Pump motor 44 receives power via motor power circuit M directly from primary controller 28, while primary and boost heaters 102a, 102b, 104a, and 104b receive power indirectly via contactor 112.

In one embodiment, primary controller 28 (see FIG. 6) acts as a motor controller for pump motor 44. Primary controller 28 can, for instance, control motor 44 to drive pumps 14a and 14b based on sensed or predicted pressure values to achieve target or commanded pressure values within spray dispenser 10, e.g. at sprayer 27. Primary controller simultaneously provides commanded temperatures $CT_a$ and $CT_b$ for A-side and B-side fluid, respectively. Commanded temperatures $CT_a$ and $CT_b$ are target temperatures that may be entered by a human operator, selected from a preset list, or determined by primary controller 28. Commanded temperatures $CT_a$ and $CT_b$ can be highly material-dependent, and are selected primarily to achieve desirable viscosities of A-side and B-side fluids. Commanded temperatures $CT_a$ and $CT_b$ need not be the same.

Heater logic controller 120 processes commanded temperatures $CT_a$ and $CT_b$ to produce power commands $PC_a$ and $PC_b$ specifying power pulse intervals for primary heaters 102a and 102b, respectively. Heater logic controller 120 may in some embodiments base power commands $PC_a$ and $PC_b$ in part on differences between commanded temperatures $CT_a$ and $CT_b$ and actual fluid temperatures $AT_a$ and $AT_b$ provided by temperature sensors 122a and 122b, respectively (see FIG. 6). Temperature sensors 122a and 122b can, for example, be situated within fluid lines 16a and 16b, in heater module 46, and/or in reservoirs 12a and 12b. Power commands $PC_a$ and $PC_b$ are set to achieve and/or maintain target commanded temperatures $CT_a$ and $CT_b$.

Primary heater control modules 114a and 114b relay power received from heater power circuit H through contactor 112 to primary heaters 102a and 102b in discrete pulses specified by power commands $PC_a$ and $PC_b$, respectively. Logic controller 120 commands more frequent pulses to achieve or maintain higher temperatures, or when differences between commanded temperatures $CT_a$ or $CT_b$ and actual fluid temperatures $AT_a$ and $AT_b$ are large. Correspondingly, logic controller 120 commands less frequent pulses where commanded temperatures $CT_a$ or $CT_b$ are low, or where actual fluid temperatures are close to commanded values. Intervals of commanded pulses may range from multiple pulses each second to only few pulses per minute, or even several minutes between pulses. A- and B-side power commands $PC_a$ and $PC_b$ need not be the same.

Auxiliary power relays 116a and 116b can, for instance, be solid state relays chained from primary heater control modules 114a and 114b, respectively. Boost relay 118 can, for instance, be an electromechanical relay. Like primary heater control modules 114a and 114b, auxiliary power relays 116a and 116b draw pulsed power via contactor 112 based on A-side and B-side power commands $PC_a$ and $PC_b$. Unlike primary heater control modules 114a and 114b, auxiliary power relays 116a and 116b draw power from motor power circuit M. Auxiliary power relays 116a and 116b may, for instance, be chained off of heater control modules 114a and 114b and receive A- and B-side power commands $PC_a$ and $PC_b$ from heater control modules 114a and 114b, or may receive power commands $PC_a$ and $PC_b$ directly from logic controller 120.

When spray dispenser 10 is in a recirculation mode, primary controller 28 commands boost relay 118 via boost command BC to relay power from motor power circuit M to contactor 112, so that boost heaters 104a and 104b receive power pulses whenever primary heaters 102a and 102b do. When spray dispenser 10 is in a spray mode, however, boost command BC instructs boost relay 118 to disconnect motor power circuit M from auxiliary power relays 116, interrupting power to boost heaters 104a and 104b. In this way, heater control system 48 ensures that boost heaters 104a and 104b draw power from motor power circuit M only during recirculation modes of spray dispenser 10, and not during spray modes.

In some embodiments, primary controller 28 may switch between spray and recirculation modes for provision of power to boost heaters 104a and 104b based on available amperage. For example, primary controller 28 may activate primary heaters 102a and 102b at all times, but activate boost heaters 104a and 104b (via boost command BC) only when a sensed power draw of motor 44 for pumps 14a and 14b drops below a threshold value. This threshold value is selected such that total power draw from motor 44 and heating module 46 never exceeds a rated circuit amperage limit (e.g. 15 A or 20 A each for motor power circuit M and heater power circuit H). In this way, spray and recirculation modes may be defined with respect to sensed power draw.

In alternative embodiments, primary controller 28 may switch between spray and recirculation modes for provision of power to boost heaters 104a and 104b based on commanded pressure or pressures for A-side and B-side fluids. For example, primary controller 28 may activate both primary heaters 102a and 102b at all times, but activate boost heaters 104a and 104b (via boost command BC) only when commanded fluid pressure falls below a threshold value. In this way, spray and recirculation modes may be defined with respect to commanded pressure values.

Recirculation modes are low-pressure modes used to heat up A-side and B-side fluids to target temperatures prior to spraying. The heater control scheme utilized by heater control system 48 allows spray dispenser 10 to provide extra heating for A-side and B-side fluids during this heat-up period. Conversely, spray modes are high-pressures modes used when spray dispenser 10 must pressurize fluids for spraying from sprayer 27. The heater control scheme described above allows spray dispenser to conserve power for motor 44 of pumps 14a and 14b during spray modes by deactivating boost heaters 104a and 104b to reduce heating system power draw. Spray and recirculation modes are delineated such that heater control system 48 ensures total power draw of spray dispenser 10 will not exceed a maximum current limit.

Although the present invention has been described with reference to preferred embodiments, workers skilled in the art will recognize that changes may be made in form and detail without departing from the spirit and scope of the invention.

The invention claimed is:

1. A mobile spray dispenser comprising:
a fluid reservoir;
a motorized pump disposed to pump fluid from the fluid reservoir;
a sprayer
a fluid circulation system capable of operating in a plurality of alternative modes, the modes comprising:
wherein the motorized pump has a high-pressure spray mode wherein fluid from the fluid reservoir is provided to the sprayer; and
wherein the motorized pump has a low-pressure recirculation mode wherein fluid is circulated to a return hose back to the reservoir via the sprayer, and wherein the motorized pump draws lower power in the low-pressure recirculation mode than in the high-pressure spray mode;
a heating unit disposed within the fluid circulation system to heat the fluid to a target temperature, the heating unit comprising:
a primary heater configured to be active during both the high-pressure spray mode and the low-pressure recirculation mode; and
a boost heater in fluid series with the primary heater and configured to be active only during the low-pressure recirculation mode; and
wherein during both the high-pressure spray mode and the low-pressure spray mode the fluid flows from the motorized pump to the boost heater to the primary heater and the sprayer.

2. The mobile spray dispenser of claim 1, wherein the primary heater and the boost heater are resistive heaters.

3. The mobile spray dispenser of claim 2, wherein the primary heater and the boost heater each comprise a helical fluid path about a resistive cylindrical element.

4. The mobile spray dispenser of claim 2, wherein the primary heater and the boost heater draw power from a shared electrical contactor.

5. The mobile spray dispenser of claim 2, and further comprising a primary heater control module and a logic control module, wherein current to the primary heater is regulated by the primary heater control module according to a control signal from the logic control module that sets a current pulse interval to achieve and maintain the target temperature.

6. The mobile spray dispenser of claim 5, wherein current to the boost heater is regulated by a solid state auxiliary relay chained from the primary heater control module, such that the boost heater receives current pulses only when the primary heater receives current pulses.

7. The mobile spray dispenser of claim 1, further comprising a primary controller that controls power to the motorized pump such that the motorized pump draws more current in the high-pressure spray mode than in the low-pressure recirculation mode.

8. The mobile spray dispenser of claim 7, wherein the primary controller controls power to the motorized pump to achieve a target fluid pressure.

9. The mobile spray dispenser of claim 7, further comprising an electromechanical relay that enables the boost heater in the low-pressure recirculation mode and disables the boost heater in the high-pressure spray mode based on a low-voltage signal from the motor controller.

10. The mobile spray dispenser of claim 9, wherein a delineation between the low-pressure recirculation mode and the high-pressure spray mode ensures that the total power draw of the motorized pump and the heating unit does not exceed a maximum current limit.

11. The mobile spray dispenser of claim 10, wherein the primary heater receives power via a first power circuit, and motorized pump and boost heater draw power via a second power circuit, and wherein the first power circuit and the second power circuit have separate maximum current limits.

12. The mobile spray dispenser of claim 11, wherein the maximum current limits of the first and second power circuits are 15 A or 20 A.

13. The mobile spray dispenser of claim 1, wherein the fluid circulation system contains separate motorized pumps, fluid reservoirs, and fluid lines for two distinct fluids mixed at the sprayer, and the heating unit comprises separate primary and boost heaters for each fluid.

14. The mobile spray dispenser of claim 13, wherein the separate primary and boost heaters for each fluid are separately controlled to achieve different target temperatures.

15. A heater control method comprising: a mobile spray dispenser as from claim 1;
powering the motorized pump to circulate fluid at a required pressure;
pulsing power to the primary heater in regular intervals selected to heat the circulating fluid to a target temperature;
pulsing power to the boost heater in synchronously with the primary heater while the motorized pump operates in the low-pressure recirculation mode; and
cutting power to the boost heater while the motorized pump operates in the high-pressure spray mode.

16. The heater control method of claim 15, further comprising determining power draw of the motorized pump and comparing the power draw of the motorized pump to a threshold power draw, and wherein the low-pressure recirculation mode is defined by power draw of the motorized pump falling below the threshold power value, while the high-pressure spray mode is defined by power draw of the motorized pump exceeding the threshold power value.

17. The heater control method of claim 15, further comprising controlling power to the motorized pump based on a commanded value of the required pressure and comparing the commanded value to a threshold pressure value, and wherein the low-pressure recirculation mode is defined by the commanded value falling below the threshold pressure value, while the high-pressure spray mode is defined by the commanded value exceeding the threshold pressure value.

* * * * *

UNITED STATES PATENT AND TRADEMARK OFFICE
CERTIFICATE OF CORRECTION

Page 1 of 1

PATENT NO. : 9,849,475 B2
APPLICATION NO. : 14/650758
DATED : December 26, 2017
INVENTOR(S) : Christopher J. Pellin et al.

It is certified that error appears in the above-identified patent and that said Letters Patent is hereby corrected as shown below:

In the Claims

Column 8, Line 29:
Delete "spray mode"
Insert --recirculation mode--

Signed and Sealed this
Ninth Day of October, 2018

Andrei Iancu
*Director of the United States Patent and Trademark Office*